United States Patent [19]
Libhart

[11] 3,985,208
[45] Oct. 12, 1976

[54] WHEEL BRAKE
[75] Inventor: Anthony C. Libhart, Waco, Tex.
[73] Assignee: The Colson Company, Jonesboro, Ark.
[22] Filed: Apr. 9, 1975
[21] Appl. No.: 566,234

[52] U.S. Cl. ................................ 188/1 D; 16/35 R; 188/72.7
[51] Int. Cl.² ...................... B60T 1/06; B60B 33/00
[58] Field of Search ........... 16/35 D, 35 R; 188/1 D, 188/69, 71.1, 72.1, 72.7, 72.8, 72.9

[56] References Cited
UNITED STATES PATENTS

| | | | |
|---|---|---|---|
| 918,636 | 4/1909 | Young | 188/72.8 |
| 1,863,349 | 6/1932 | Noelting et al. | 188/69 |

FOREIGN PATENTS OR APPLICATIONS

| | | | |
|---|---|---|---|
| 1,461,474 | 11/1966 | France | 16/35 R |

*Primary Examiner*—Duane A. Reger
*Attorney, Agent, or Firm*—Wegner, Stellman, McCord, Wiles & Wood

[57] ABSTRACT

A brake for use in connection with wheels, such as truck casters. The brake structure is adapted to be added to existing truck casters as well as original equipment. The brake permits facilitated operation. The brake includes an operating member which engages a cam member having opposed oppositely inclined cam surfaces defined by side flanges thereof to provide facilitated braking action.

10 Claims, 4 Drawing Figures

U.S. Patent  Oct. 12, 1976  3,985,208
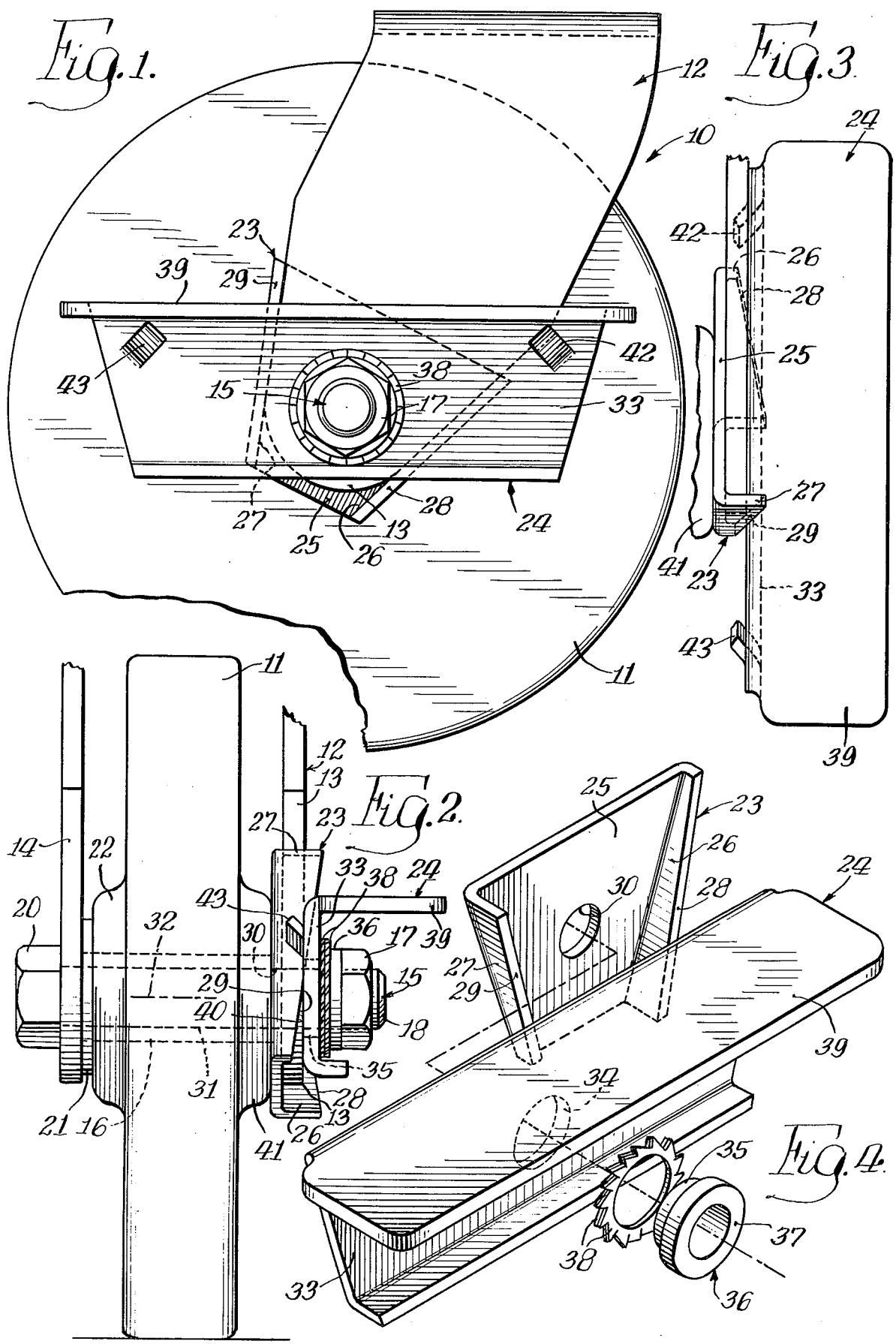

WHEEL BRAKE

BACKGROUND OF THE INVENTION

1. Field of the Invention

This invention relates to wheel structures and in particular to means for selectively locking wheels, such as cart casters.

2. Description of the Prior Art

It is desirable to provide means for locking caster wheels against rotation such as where the caster wheels are used on trucks and the like. One form of lock lever caster is illustrated in U.S. Pat. No. 1,137,329 of J. A. Johnson. As shown therein, the locking means utilizes a cam forcing a broad surface of a lock lever against a side of the caster roller so as to bind the roller throughout an extended area.

In U.S. Pat. No. 1,863,349 of William H. Noelting et al, a brake caster is provided having a clutch member carried by the wheel and a second clutch member carried by one of the ears of the yoke supporting the wheel. A nut is provided on the wheel supporting bolt which includes radially arranged grooves with a lever being seatable in one of the grooves.

In Edward H. Schultz, Jr. U.S. Pat. No. 2,147,064, a caster wheel brake is disclosed having a pedal means permitting operation of the brake by a person's foot. The brake includes a brake arm and a cam lever which is rocked in effecting the braking action.

In John F. Kostolecki et al U.S. Pat. No. 2,905,275, a caster brake is disclosed having cams arranged to lower a brake member to bring a wheel braking portion into engagement with the wheel.

In Edwin T. Clinton et al U.S. Pat. No. 3,070,828, a removable caster lock is disclosed wherein means are provided for locking the caster wheels at right angles to the direction of movement of the article being supported to effectively brake the article.

In U.S. Pat. No. 3,467,981, of Joseph E. Peter, a caster brake is disclosed having plungers which are displaced inwardly by a washer to effect axial displacement of the caster wheel causing it to frictionally engage the opposite leg of the caster fork to effect the desired braking action.

SUMMARY OF THE INVENTION

The present invention comprehends an improved means for selectively braking a wheel, such as a caster wheel, including a cam member having a pressure portion juxtaposed to said wheel hub, turned edge flanges engaging the support for permitting axially movable, nonrotative association of the cam member with the support, and opposed, oppositely inclined cam surfaces on the flanges, an operating member having a force applying portion and a mounting portion, and means for mounting the operating member mounting portion for axial fixed, rotative movement coaxially of the wheel, and with the force applying portion slidably engaging the cam surfaces for urging the cam member pressure portion adjustably against the wheel hub as a function of the rotational position of the operating member.

The cam member pressure portion may be trapezoidal with the edge flanges being defined by the angularly defined side edges thereof.

The operating member may be provided with a turned flange extending the length thereof for facilitated operation in the selective locking action.

The wheel lock means of the present invention is extremely simple and economical of construction while yet providing an improved locking operation.

BRIEF DESCRIPTION OF THE DRAWING

Other features and advantages of the invention will be apparent from the following description taken in connection with the accompanying drawing wherein:

FIG. 1 is a fragmentary side elevation of a wheel mount having an improved locking means embodying the invention;

FIG. 2 is a fragmentary end elevation thereof;

FIG. 3 is a fragmentary top plan view thereof; and

FIG. 4 is an exploded perspective view of the locking means.

DESCRIPTION OF THE PREFERRED EMBODIMENT

In the exemplary embodiment of the invention as disclosed in the drawing, a wheel mount generally designated 10 is shown to comprise a caster wheel 11 rotatably carried on a support 12 which, as shown in FIG. 2, may comprise a pair of support legs 13 and 14 spaced apart to receive the wheel 11 therebetween for rotation on a mounting bolt 15 carried by the support legs 13 and 14. The bolt is provided with a sleeve bearing 16 extending between legs 13 and 14 and is locked in place by means of a conventional nut 17 on a threaded distal portion 18. A washer 21 may be provided between leg 14 and the hub 22 of wheel 11.

The locking means of the present invention includes a cam member generally designated 23 and an operating member generally designated 24. Cam member 23 includes a pressure portion 25 which, as seen in FIG. 4, may be trapezoidal narrowing downwardly. The cam member further includes outwardly turned side edge portions 26 and 27 having opposed oppositely inclined cam surfaces 28 and 29. Pressure portion 25 may be provided with a central hole 30 for freely passing the shank 31 of bolt 15 whereby the cam member is mounted on the bolt with flanges 26 and 27 preventing rotational movement of the cam member about the axis 32 of the wheel mount.

Operating member 24 includes a rectangular base wall having a hole 34 aligned with cam member hole 30 and receiving a small diameter portion 35 of a bushing 36. Bushing 36 includes a large diameter portion 37 received between the nut 17 and wall 33 circumjacent opening 34. A pair of spring washers 38 are disposed between bushing portion 37 and wall 33.

The operating member further includes an outturned upper flange 39 adapted to be engaged by the user's foot in swinging, or rotating, the operating member about the axis 32 with the wall 33 defining a force applying portion 40 adapted to slidably engage the cam surfaces 28 and 29 and as a function of the angular disposition of the operating member, adjustably urge the cam member against the hub boss 41.

The spring washer 38 selectively frictionally locks the operating member in the adjusted position. As shown in FIG. 1, the wall portion 33 of the operating member may be provided with raised tangs 42 and 43 limiting the swinging movement of the operating member between a fully retracted and a fully locked position, the operating member being shown in the fully locked position in FIG. 1.

In the illustrated embodiment, flanges 26 and 27 are rectilinear and wall 33 is planar to provide an improved camming action therebetween. The flange 39 extends the full length of the elongated wall 33 for further improved operation of the locking means.

The locking means may be provided as an add-on kit, permitting installation on existing caster devices by simple installation of the cam member between the wheel hub and one leg of the support, and the provision of the operating member bushing and spring washer outwardly of the supporting leg.

The improved brake means, as shown in FIG. 4, is extremely simple and economical of construction while yet permitting the facilitated installation and improved braking action discussed above.

The foregoing disclosure of specific embodiments is illustrative of the broad inventive concepts comprehended by the invention.

I claim:

1. In a wheel mount including a wheel having a hub, a support defining opposite edges, means for mounting the wheel to the support for axially fixed, rotative movement, the improvement comprising:
a cam member having a generally U-shaped transverse cross section defining a pressure portion juxtaposed outwardly to said wheel hub, turned edge flanges engaging the support edges for permitting axially movable, nonrotative association of the cam member with the support, and opposed, oppositely inclined cam surfaces on said flanges, said cam member embracing said support with said flanges projecting to beyond said support to dispose said cam surfaces outwardly thereof; an operating member having a force applying portion, and a mounting portion; and means for mounting said operating member mounting portion outwardly of said cam member for axial fixed, rotative movement coaxially of said wheel, and with the force applying portion slidably concurrently engaging each of said cam surfaces for urging the cam member pressure portion adjustably against the wheel hub as a function of the rotational position of said operating member.

2. The wheel mounting improvement of claim 1 wherein said means for mounting said mounting portion includes friction means for releasably retaining the operating member in adjusted disposition.

3. The wheel mounting improvement of claim 1 wherein said operating member is provided with stop means for selective engagement with the support to limit the rotative movement of the operating member.

4. The wheel mounting improvement of claim 1 wherein said cam member pressure portion is trapezoidal and said edge flanges are defined by the angularly related side edges thereof.

5. The wheel mounting improvement of claim 1 wherein said operating member includes an operating portion adapted to be engaged by a user for urging the operating member selectively rotatively.

6. The wheel mounting improvement of claim 1 wherein said operating member includes an operating portion adapted to be engaged by a user for urging the operating member selectively rotatively, said operating portion comprising a turned flange projecting outwardly parallel to the axis of rotation of the wheel.

7. The wheel mounting improvement of claim 1 wherein said means for mounting said operating member mounting portion comprises a stepped annular bushing, having a small diameter portion received in a complementary hole in said mounting portion.

8. The wheel mounting improvement of claim 1 wherein said means for mounting said operating member mountng portion comprises a stepped annular bushing, having a small diameter portion received in a complementary hole in said mounting portion and a large diameter portion outwardly of said mounting portion, a resilient washer being disposed between said large diameter portion and said operating member mounting portion for resiliently urging said force applying portion against said cam member flange cam surfaces.

9. The wheel mounting improvement of Claim 1 wherein said flanges are rectilinear.

10. The wheel mounting improvement of Claim 1 wherein said operating member comprises an elongated rectangular wall defining said force applying and mounting portions, and a flange turned from one long edge of said wall defining an operating portion to be engaged by a user for urging the operating member selectively rotatively.

* * * * *